United States Patent Office 3,574,779
Patented Apr. 13, 1971

3,574,779
SYNTHESIS OF PARAFFINIC HYDROCARBONS
George R. Lester, Park Ridge, and Cecelia J. Louvar, Evanston, Ill., assignors to Universal Oil Products Company, Des Plaines, Ill.
No Drawing. Continuation-in-part of abandoned application Ser. No. 531,057, Mar. 2, 1966. This application Dec. 6, 1968, Ser. No. 781,982
Int. Cl. C07c 9/00
U.S. Cl. 260—676
11 Claims

ABSTRACT OF THE DISCLOSURE

Olefinic hydrocarbons, and particularly normal olefinic hydrocarbons, are converted to paraffinic hydrocarbons containing one carbon atom less and one carbon atom more than the olefinic hydrocarbon by disproportionation of the latter in the presence of hydrogen and a metal oxide catalyst such as molybdenum and cobalt oxides on alumina which have been pretreated with oxygen prior to use thereof as a catalyst.

---

This application is a continuation-in-part of copending application, Ser. No. 531,057, filed Mar. 2, 1966, now abandoned.

This invention relates to a process for the synthesis of paraffinic hydrocarbons. More particularly, the invention is concerned with a process for synthesizing straight-chain paraffinic hydrocarbons containing one carbon atom less and one carbon atom more than the olefinic hydrocarbon which has been used as the starting material, said synthesis being effected in the presence of certain catalytic compositions of matter.

Paraffinic hydrocarbons, and particularly straight-chain paraffinic hydrocarbons, will find a wide variety of uses in the chemical field. For example, they may be utilized as starting materials for the preparation of alcohols or haloalkanes. In addition, a straight-chain paraffin such as n-decane may be used as a solvent or in organic synthesis as will n-tetradecane, octane and other normal paraffinic hydrocarbons. In view of these uses as solvents, it is necessary that said solvents, in some instances, possess different boiling point, whereby a desired product can be more easily separated from said solvents if the product and the solvents possess boiling points which are relatively disperate.

It is therefore an object of this invention to provide a process for synthesizing straight-chain paraffinic hydrocarbons by treating a normal olefinic hydrocarbon with hydrogen in the presence of certain catalytic compositions of matter.

In one aspect an embodiment of this invention resides in a process for synthesizing paraffinic hydrocarbons which comprises contacting an olefinic hydrocarbon at disproportionation conditions with hydrogen in the presence of a metal oxide catalyst which has been activated prior to its contact with the olefinic hydrocarbon by treatment thereof with an oxygen-containing gas at a temperature in the range of from about 500° to about 600° C., at a pressure of from about atmospheric to about 2000 pounds per square inch and for a time period of from about 1 to about 10 hours, and recovering the paraffinic hydrocarbons containing one carbon atom less and one carbon atom more than said olefinic hydrocarbon.

A specific embodiment of this invention is found in a process which comprises treating propylene with hydrogen in the presence of a metal oxide catalyst comprising molybdenum oxide composited on alumina, said catalyst having been activated prior to its use thereof by treatment with air at a temperature in the range of from about 500° to about 600° C. and a pressure in the range of from about atmospheric to about 2000 pounds per square inch, the treatment of propylene being effected at a temperature of from about 75° to about 400° C. and a pressure in the range of from about atmospheric to about 100 atmospheres, and recovering ethane and normal butane.

Other objects and embodiments will be found in the following further detailed description of this invention.

As hereinbefore set forth, the present invention is concerned with a process for the synthesis of paraffinic hydrocarbons in which olefinic hydrocarbons, preferably straight-chain olefinic hydrocarbons are treated with hydrogen in the presence of an activated metal oxide catalyst at disproportionation conditions, the resulting paraffinic hydrocarbons containing one carbon atom less and one carbon atom more than the number of carbon atoms in the original olefinic hydrocarbon. Examples of olefinic hydrocarbons which may be subjected to this combination disproportionation-hydrogenation reaction include propylene, 1-butene, 2-butene, 1-pentene, 2-pentene, 1-hexene, 2-hexene, 3-hexene, 1-heptene, 2-heptene, 3-heptene, 1-octene, 2-octene, 3-octene, 4-octene, 1-nonene, 2-nonene, 3-nonene, 4-nonene, 1-decene, 2-decene, 3-decene, 4-decene, 1-undecene, 2-undecene, 3-undecene, 4-undecene, 1-dodecene, 2-dodecene, 3-dodecene, 1-tridecene, 2-tridecene, 3-tridecene, 4-tridecene, 1-tetradecene, 2-tetradecene, 3-tetradecene, 4-tetradecene, etc. It is also contemplated within the scope of this invention that isomers of the aforementioned olefins which are not straight-chain in nature such as 2-methyl-1-butene, 3-methyl-1-butene, 2-methyl-1-pentene, 2,3-dimethyl-1-pentene, 2-methyl-1-hexene, 2-methyl-1-heptene, etc. may also be used, although not necessarily with equivalent results.

The disproportionation-hydrogenation process of the present invention is effected in the presence of a metal oxide catalyst of a type hereinafter set forth in greater detail. However, before utilizing these catalysts in the reaction, said catalysts are subjected to an activating step and while in an activated state are utilized to effect the particular reaction. The metal or metal oxide catalysts which are utilized as a combination disproportionation-hydrogenation catalyst will include those containing metals selected from the group consisting of Groups I–B, V–B, VI–B, VII–B, and VIII of the Periodic Table. Such metals which are used in an activated oxide form will include copper, gold, silver, vanadium, niobium, tantalum, chromium, tungsten, molybdenum, manganese, technetium, rhenium, iron, cobalt, nickel, ruthenium, rhodium, palladium osmium, iridium and platinum. The aforementioned metals or oxides of these metals may be composited, if so desired, on solid supports, this type of catalyst comprising the preferred catalytic composition which is utilized in the present invention. Specific examples of these solid supports on which the metal oxide is composited will comprise certain other metal oxides such as the various forms of alumina including alpha-alumina, gamma-alumina, eta-alumina, theta-alumina, or mixtures of certain metallic oxides such as silica-alumina, silica-zirconia, silica-magnesia, silica-alumina-magnesia, silica-thoria, silica-alumina-zirconia, etc.

The process of this invention is effected in the presence of hydrogen at a temperature in the range of from about 75° to about 40° C. or more and at a pressure ranging from about atmospheric up to about 100 atmospheres or more, the pressures of the reaction being provided for in the preferred embodiment by hydrogen. However, it is also contemplated within the scope of this invention that if a pressure in the upper area of the range hereinbefore set forth is used, only a portion thereof may be provided for by the introduction of hydrogen, the remainder of said pressure being supplied by the introduction of an inert gas such as nitrogen. The catalytic compositions of matter which is utilized to effect the combination disproportionation-hydrogenation reaction in which paraffinic hydrocarbons contaning one carbon atom less and one carbon atom more than the number of carbon atoms present in the original olefinic hydrocarbon feed stock are obtained, comprise, as hereinbefore set forth, certain metal or oxides thereof, preferably composited on a solid support, the catalytic composition of matter having been activated by a pretreatment of the catalyst prior to its use thereof in the reaction of the present invention. The activation of the metal or metal oxide catalyst is effected by treating the catalytic composition of matter with an oxygen-containing gas such as oxygen or air at an elevated temperature and pressure. The temperature which is used in the activation step will usually be in a range of from about 500° up to about 600° C. while the pressure generated by the oxygen-containing gas will range from about atmospheric up to about 2000 pounds per square inch, said activation step being effected for a predetermined period of time which may range from about 1 to about 10 hours or more in duration. Upon completion of the activation step with the oxygen-containing gas, the heating of the catalyst composition of matter is discontinued and the catalyst is allowed to cool to the operating temperature of the reaction for which it is to be used, said temperature for the disproportionation-hydrogenation reaction being from about 75° to about 400° C. During the cooling period, the aforementioned activation agent comprising an oxygen-containing gas such as oxygen or air is continuously passed over the catalyst at either atmospheric pressure or an elevated pressure ranging from about 50 to about 2000 pounds per square inch. Alternatively, the catalyst may be treated during the cooling period thereof with an inert gas such as nitrogen or helium until the desired reaction temperature has been reached. When the desired operating temperature has been reached, the treatment with the inert gas or with the activating gas is discontinued. However, if the catalyst has been treated with the activating gas during the cooling period, it is preferred that the apparatus be flushed with an inert gas prior to charging the olefinic hydrocarbon and hydrogen thereto.

The process of the present invention in which an olefinic hydrocarbon is subjected to a combined disproportionation-hydrogenation reaction may be effected in any suitable manner and may comprise a batch or continuous type operation. When a batch type operation is used, a quantity of the catalyst is placed in an appropriate reaction apparatus and thereafter activated in a manner hereinbefore set forth in greater detail. Following this, the olefinic hydrocarbon comprising the charge stock is added to the reaction vessel which is heated to the desired operating temperature. Hydrogen is passed into the vessel in a predetermined amount and the reaction allowed to proceed until the uptake of hydrogen ceases. At this time, the reaction vessel is allowed to cool to room temperature and the reaction product is recovered and subjected to fractional distillation after which the dissimilar paraffinic hydrocarbons are separated and recovered.

It is also contemplated within the scope of this invention that the process of this invention may be effected in a continuous manner of operation. When this type of operation is used, the catalyst after activation in an appropriate apparatus which is maintained at the proper operating conditions of temperature and pressure has added thereto, in a continuous manner, a stream of the olefinic hydrocarbon and hydrogen. After passage over the catalyst, the reaction product is continuously withdrawn and the reactor effluent is subjected to fractional distillation. Any unreacted olefinic hydrocarbon is recycled to form a portion of the feed stock while the paraffinic hydrocarbons containing carbon atoms one number less, one number more and the same as the number found in the olefinic hydrocarbon feed stock are subjected to separation by conventional means such as, for example, fractional distillation.

It is also contemplated within the scope of this invention that the feed stock may comprise a mixture of a paraffin and an olefin containing the same number of carbon atoms such as, for example, a propane-propylene mixture, a butane-butene mixture, a pentane-pentene mixture, a hexane-hexene mixture, etc. Examples of paraffinic hydrocarbons which may be prepared according to the process herein described will include ethane, propane, n-butane, n-pentane, n-hexane, n-heptane, n-octane, n-nonane, n-decane, n-undecane, n-dodecane, n-tridecane, n-tetradecane, n-pentadecane, n-hexadecane, etc., and isomers thereof.

The following examples are given to illustrate the process of the present invention which, however, are not intended to limit the generally broad scope of the present invention in strict accordance therewith.

EXAMPLE I

In this example a catalyst comprising 2.2 weight percent of cobalt and 5.5 weight percent of molybdenum composited on alumina, was placed in a reaction vessel. The catalyst was placed in an activated state by heating said composite in a stream of air at a temperature of about 540° C. for a period of 2 hours. Following this, the thus activated catalyst was flushed with an inert gas comprising helium for a period of from about 15 to 30 minutes while allowing the reaction vessel to cool to a temperature of 175° C. At the end of this time the feed stock comprising a mixture of 40 weight percent propane and 60 weight percent propylene was charged to the reactor along with the stream of hydrogen and passed over the catalyst which was in an activated state. The reactor was maintained at the operating temperature of 175° C. while the charge stock and hydrogen were passed therethrough at atmospheric pressure. The feed stock comprised a 2 cc. sample in hydrogen which was added as the carrier gas at a rate of 100 cc. per minute. The total residence time for the reaction was 16 seconds. The recovered product was subjected to analysis by means of a gas-liquid chromatograph. The recovered product comprised 6.3 weight percent of ethane, 5.3 weight percent of butane and 88.4 weight percent of propane, this being equivalent to 77.2% conversion of propene to propane and a 22.8% conversion of propylene to ethane and butane.

EXAMPLE II

A catalyst similar in composition to that described in Example I above is activated in a like manner at substantially the same temperature. After allowing the temperature of the reactor to cool to about 175° C. the charge stock comprising 50% n-butene and 50% butane is charged to the reactor along with hydrogen at a weight hourly spaced velocity of 10. After the desired residence time has elapsed, the product is recovered and subjected to analysis by means of a gas-liquid chromatograph. It will be found that the products contained in the reaction mixture will comprise a major portion of n-butane along with propane and n-pentane.

EXAMPLE III

In this example, a catalyst comprising cobalt oxide and molybdenum oxide composited on alumina is activated by heating the tube to a temperature of about 550° C. and thereafter purging the catalyst with 2.0 cubic feet per hour of air for a period of about 2 hours. At the end of this time, the catalyst is purged with nitrogen while cooling said catalyst from a temperature of about 550° C. to a temperature of about 175° C. during a period of about 9.5 hours. A feed comprising 40 weight percent n-octene and 60 weight percent n-octane is charged to the plant at a rate of about 100 g. per hour with hydrogen which is also charged to the plant at a rate of about 200 g. per hour. After a period of about 2 hours, the reaction product which is recovered is subjected to analysis by means of a gas-liquid chromatograph. The product will comprise a mixture of n-octane along with n-heptane and n-nonane.

EXAMPLE IV

A catalyst comprising cobalt oxide and molybdenum oxide composited on gamma-alumina is activated in a manner similar to that set forth in Example III above. After cooling the catalyst to a temperature of about 175° C. the feed stock comprising n-decene is charged to the reactor at a rate of about 100 g. per hour along with hydrogen which is also charged at the rate of 200 g. per hour. The feed stock is treated in the presence of this catalyst for a period of about 2 hours, following which the product is subjected to a gas-liquid chromatograph analysis. This analysis will disclose the presence of a major portion of n-decane along with n-nonane and n-undecane.

EXAMPLE V

A catalyst comprising cobalt oxide and molybdenum oxide composited on alumina is activated in a manner similar to that set forth in Example I above. After cooling the catalyst at a temperature of about 175° C., the addition of an inert gas such as helium is discontinued and the feed stock comprising n-tetradecane is charged thereto. In addition, the stream of hydrogen is charged to the reactor, the combined weight hourly space velocity being about 10. At the end of the residence time, during which the temperature is maintained at about 175° C., the reaction product is recovered and subjected to analysis by means of a gas-liquid chromatograph. It will be found that the reaction product comprises n-tetradecane along with n-tridecane and n-pentadecane.

We claim as our invention:

1. A process for synthesizing paraffinic hydrocarbons by olefin disproportionation-hydrogenation which comprises contacting an acyclic mono-olefinic hydrocarbon at disproportionation conditions with hydrogen in the presence of a metal or metal oxide catalyst the phrase in which the metal is selected from the group consisting of Groups I–B, V–B, VI–B VII–B and VIII of the Periodic Table which has been activated prior to its contact with the olefinic hydrocarbon by treatment thereof with an oxygen-containing gas at a temperature in the range of from about 500° to about 600° C., at a pressure of from about atmospheric to about 2000 pounds per square inch and for a time period of from about 1 to about 10 hours, and recovering the paraffinic hydrocarbons containing one carbon atom less and one carbon atom more than said olefinic hydrocarbon.

2. The process as set forth in claim 1 in which said disproportionation conditions include a temperature in the range of from about 75° to about 400° C. and a pressure in the range of from about atmospheric to about 100 atmospheres.

3. The process as set forth in claim 1 in which said olefinic hydrocarbon and said paraffinic hydrocarbons are of straight-chain configuration.

4. The process as set forth in claim 1 in which said oxygen-containing gas comprises air.

5. The process as set forth in claim 1 in which said metal oxide catalyst comprises molybdenum oxide composited on alumina.

6. The process as set forth in claim 1 in which said metal oxide catalyst comprises a mixture of molybdenum oxide and cobalt oxide composited on alumina.

7. The process as set forth in claim 1 in which said olefinic hydrocarbon comprises propylene and said paraffinic hydrocarbons comprise ethane and butane.

8. The process as set forth in claim 1 in which said olefinic hydrocarbon comprises n-butene and said paraffinic hydrocarbons comprise propane and n-pentane.

9. The process as set forth in claim 1 in which said olefinic hydrocarbon comprises n-octene and said paraffinic hydrocarbons comprise n-heptane and n-nonane.

10. The process as set forth in claim 1 in which said olefinic hydrocarbon comprises n-decane and said paraffinic hydrocarbons comprise n-nonane and n-undecane.

11. The process as set forth in claim 1 in which said olefinic hydrocarbon comprises n-tetradecene and said paraffinic hydrocarbons comprise n-tridecane and n-pentadecane.

References Cited

UNITED STATES PATENTS

| | | | |
|---|---|---|---|
| 3,161,697 | 12/1964 | Chou Foer et al. | 260—683.15 |
| 3,261,879 | 7/1966 | Banks et al. | 260—683 |
| 2,332,572 | 9/1943 | Hepp et al. | 260—676 |
| 2,584,531 | 2/1952 | Arnold et al. | 260—683.9 |
| 2,775,638 | 12/1956 | Milliken et al. | 260—683.15 |
| 2,572,300 | 10/1951 | Arnold et al. | 260—683.2 |

DELBERT E. GANTZ, Primary Examiner

C. E. SPRESSER, Jr., Assistant Examiner

U.S. Cl. X.R.

260—683.9